United States Patent Office 2,911,357
Patented Nov. 3, 1959

2,911,357

CATALYSTS FOR THE CONVERSION AND REFORMING OF HYDROCARBONS COMPRISING A PLATINUM GROUP METAL WITH A STABILIZING METAL

John W. Myers and Frederick A. Prange, Bartlesville, Okla., assignors to Phillips Petroleum Company, a corporation of Delaware No Drawing. Application December 30, 1955
Serial No. 556,479

14 Claims. (Cl. 208—138)

This invention relates to improved platinum-type catalysts, to a method of stabilizing such catalysts, and to an improved process for the catalytic conversion of hydrocarbons using the improved catalysts.

Platinum-type catalysts have come into commercial use in the conversion of hydrocarbons. Catalysts containing platinum and described in the literature have been used commercially for the reforming of naphthas. A well-known disadvantage of such catalysts in reforming, however, is their tendency to lose activity after a period in use at elevated temperatures, which is particularly short when the catalyst is subjected to periodic regeneration by oxidation to remove carbonaceous deposits formed during the hydrocarbon conversion. A careful inspection of platinum catalysts which have lost activity in this way, by X-ray and other crystallographic techniques according to the literature indicates that the platinum which was originally present in a highly dispersed amorphous form has a tendency to grow into metallic crystals having a larger size and much lower surface area corresponding to their greatly reduced catalytic activity. We have devised a method of stabilizing platinum-type catalysts which results in the production of improved catalysts and improved hydrocarbon conversion processes utilizing these catalysts.

The principal object of the invention is to provide improved stabilized platinum-type catalysts. Another object is to provide a method of stabilizing platinum-type catalysts so as to increase the life of such catalysts in hydrocarbon conversion processes operated at elevated temperatures. A further object of the invention is to provide an improved hydrocarbon conversion process utilizing the stabilized platinum-type catalysts whereby the yield of converted hydrocarbon is improved because of the higher catalyst activity over extended periods of use of the catalysts. It is also an object of the invention to provide an improved process for the reforming of naphthas. Other objects of the invention will become apparent from a consideration of the accompanying disclosure.

The catalytic metals with which this invention is concerned are metals of group IB, VIIA, and VIII of the periodic system. The improved catalysts of this invention comprise alloys of combinations of two or more of these metals on suitable catalyst bases. The alloy of two or more metals comprises at least one metal from group A with at least one metal from group B. Group A consists of those group VIII metals which either do not form oxides at 1500° F. in air or the oxide is unstable at 1500° F. These metals are platinum, palladium, and rhodium. Group B consists of the remaining metals, specifically, (1) group VIII metals which form relatively stable oxides at 1500° F. in air including cobalt and ruthenium, (2) group VIIA metals which form stable oxides at 1500° F. in air, i.e., manganese, and (3) the metals of group IB, copper, silver, and gold. Preferred compositions are alloys as contrasted with intermetallic compounds.

The preferred catalyst composition contains 0.01 to 4 weight percent platinum and more desirably 0.01 to 1 weight percent platinum with the stabilizing metal in the range of 1 to 100 weight percent of the platinum present in the catalyst, the catalyst base making up the balance. Suitable catalyst bases comprise alumina, halogen-treated alumina, silica, magnesia, zirconia, alumina composited with silica-alumina, silica-zirconia-alumina, and bauxite.

Specific methods of preparing catalysts according to our invention will now be described. In general, a support such as alumina, silica, silica-alumina, or other suitable support is impregnated with a solution of compounds of the metals containing suitable anions and the impregnated support is calcined by heating in air or hydrogen. The catalysts may be activated by heat treating at a temperature in the range of 700 to 1300° F., preferably 800 to 1050° F. It is preferred to use compounds having common anions and the preferred anions are fluorine and chlorine. Examples of compounds suitable for use in the process comprise chloroplatinic acid, platinum sulfate, and platinic chloride. The corresponding compounds of palladium and also palladium nitrate are suitable for use in the process. Rhodium chloride is suitable when incorporating this metal in the catalyst. Any compounds of the group A and B metals that are mutually soluble in the impregnating solution are operable in the process. The support may be fluoride treated; or it may be an untreated support; or the composite catalyst may be treated with a fluoriding compound.

These catalysts are especially active in the reactions involved in naphtha reforming including dehydrogenation, dehydrocyclization, isomerization, and hydrogenation and have very long life.

In order to illustrate the invention, the following examples are provided; however, they are to be construed as exemplary and not to unnecessarily or unduly limit the invention.

Example I

The following catalysts were heat-treated at about 1050° F. in air and then examined by X-ray to determine the extent of platinum crystal growth:

A: Prepared to have the weight percent compositions—4 platinum—96 alumina by impregnating alumina with chloroplatinic acid.

B: Prepared to have the weight percent composition—4 platinum—1 palladium—95 alumina by impregnating alumina with a solution of chloroplatinic acid and palladium chloride.

C: Prepared to have the weight percent composition—4 platinum—1 rhodium—95 alumina by impregnating alumina with a solution of chloroplatinic acid and rhodium chloride.

D: Prepared to have the weight percent composition—4 platinum—1 ruthenium—95 alumina by impregnating alumina with a solution of chloroplatinic acid and ruthenium chloride.

E: Prepared to have the weight percent composition—4 platinum—0.75 cobalt—95.25 alumina by impregnating alumina with a solution of chloroplatinic acid and cobalt chloride.

Results of the X-ray measurements were:

| Catalysts | Indicated relative crystallinity (based on 4 Pt— 96 $Al_2O_3$ as 100) |
|---|---|
| A, 4 Pt—96 $Al_2O_3$ | 100 |
| B, 4 Pt—1 Pd—95 $Al_2O_3$ | 100 |
| C, 4 Pt—1 Rh—95 $Al_2O_3$ | 100 |
| D, 4 Pt—1 Ru—95 $Al_2O_3$ | 79 |
| E, 4 Pt—0.75 Co—95.25 $Al_2O_3$ | 74 |

These data indicate that cobalt, iridium, and ruthenium decreased platinum crystal growth, and that rhodium and palladium did not decrease growth.

Example II

The following three catalysts were prepared and tested in the dehydrocyclization of normal heptane.

F: Prepared to have the weight percent composition—0.55 platinum—99.45 alumina by impregnating alumina with chloroplatinic acid, drying at 170° F., and heating to about 850° F. in hydrogen.

G: Prepared to have the weight percent composition—0.55 platinum—0.3 cobalt—99.15 alumina by impregnating alumina with a solution of chloroplatinic acid and cobalt chloride, drying at 170° F., and heating to about 850° F. in hydrogen.

H: Prepared to have the weight percent composition—0.55 platinum—0.1 cobalt—99.35 alumina by impregnating alumina with a solution of chloroplatinic acid and cobalt chloride, drying at 170° F., and heating to about 850° F. in hydrogen.

These catalysts were tested before and after heat-treating at 1050° F. in air with the following results:

|  | F 0.55 Pt | | G 0.55 Pt—0.3 Co | | H 0.55 Pt—0.1 Co | |
| --- | --- | --- | --- | --- | --- | --- |
|  | Before | After [1] | Before | After | Before | After |
| Run No. | 1 | 2 | 3 | 4 | 5 | 6 |
| Process Cond.: | | | | | | |
| Temp., °F | 941 | 948 | 937 | 950 | 942 | 941 |
| LHSV | 1.2 | 1.2 | 1.1 | 1.2 | 1.2 | 1.1 |
| Press., p.s.i.g | 50 | 50 | 50 | 50 | 50 | 50 |
| $H_2$/heptane, mol ratio | 3.2 | 3.1 | 2.9 | 3.1 | 3.1 | 3.3 |
| $C_{6+}$ product, wt. percent | 66.2 | 49.6 | 54.5 | 52.6 | 61.0 | 59.4 |
| Aromatics in $C_{6+}$, LV percent | 95.3 | 98.0 | 97.9 | 97.1 | 95.5 | 95.0 |

[1] Heated-treated in air at about 1050° F. for 21 hours, cooled to about 300–400° F., flushed with nitrogen, and heated to about 850° F. in $H_2$ and maintained at this temperature for about 15 hours.

These data show that cobalt stabilizes the catalyst and also that 0.1 wt. percent cobalt is preferable to 0.3% cobalt in a catalyst to be used in dehydrocyclization.

Each of catalysts A to I inclusive contained a small amount of chlorine but the compositions stated are on a chlorine free basis.

Certain modifications of the invention will become apparent to those skilled in the art and the illustrative details disclosed are not to be construed as imposing unnecessary limitations on the invention.

We claim:

1. A catalyst consisting essentially of a solid support having impregnated thereon an alloy of at least one metal of group A consisting of Pt, Pd, and Rh with at least one metal of group B consisting of Co, Ru, Mn, Cu, Ag, and Au, the total metal of group A being in the range of 0.01 to 4 weight percent of the support and the total metal of group B being in the range of 1 to 100 weight percent of the metal of group A.

2. The catalyst of claim 1 including Pt and Co.

3. The catalyst of claim 1 including Pt and Ru.

4. The catalyst of claim 1 including Pt and Mn.

5. The catalyst of claim 1 including Pt and Cu.

6. The catalyst of claim 1 wherein the support comprises essentially alumina, the group A metal comprises essentially Pt, and the group B metal comprises essentially Co.

7. The catalyst of claim 6 wherein the weight of the Pt is in the range of 0.1 to 1.0 percent of the weight of the support and the weight of the Co is less than ⅓ of the weight of the Pt.

8. The catalyst of claim 1 wherein the support is one of the group consisting of alumina, halogen treated alumina, silica-alumina, silica, magnesia, zirconia, and mixtures thereof.

9. The catalyst of claim 8 including Pt and Co.

10. A method of stabilizing a supported catalyst containing a metal of the group consisting of Pt, Pd, and Rh as an essential component which comprises impregnating in the support, in addition to said metal, a solution of a compound of a stabilizing metal of the group consisting of Co, Ru, Mn, Cu, Ag, and Au; and heating the impregnated support in a $H_2$-containing ambient at an elevated temperature sufficient to reduce the metal compound to elemental metal and form alloy.

11. The method of claim 10 wherein said support comprises alumina as an essential component of the support, said catalyst includes Pt, and the stabilizing metal comprises Co.

12. In a process for the catalytic conversion of hydrocarbons in contact with a supported catalyst consisting essentially of a solid support and a metal of the group consisting of Pt, Pd, and Rh at conversion conditions, the improvement comprising stabilizing said metal by incorporating in said catalyst a metal of the group consisting of Co, Ru, Ir, Mn, Cu, Ag, and Au to form an alloy metal of metals so as to retard crystallization of the metal of first said group.

13. The process of claim 12 wherein the essential metal comprises Pt and the stabilizing metal comprises Co.

14. The process of claim 13 wherein hydrocarbons boiling in the naphtha boiling range are reformed under reforming conditions.

References Cited in the file of this patent
UNITED STATES PATENTS

| 2,131,089 | Beeck et al. | Sept. 27, 1938 |
| 2,635,080 | Appel | Apr. 14, 1953 |
| 2,662,861 | Riblett et al. | Dec. 15, 1953 |
| 2,739,927 | Doumani | Mar. 27, 1956 |
| 2,848,377 | Webb | Aug. 19, 1958 |

UNITED STATES PATENT OFFICE

CERTIFICATE OF CORRECTION

Patent No. 2,911,357                       November 3, 1959

John W. Myers et al.

It is hereby certified that error appears in the printed specification of the above numbered patent requiring correction and that the said Letters Patent should read as corrected below.

Column 4, lines 41 and 42, for "to form an alloy metal of metals" read -- to form an alloy of the metals --.

Signed and sealed this 28th day of June 1960.

(SEAL)
Attest:

KARL H. AXLINE
Attesting Officer

ROBERT C. WATSON
Commissioner of Patents